US007946010B1

(12) United States Patent
Myers et al.

(10) Patent No.: US 7,946,010 B1

(45) Date of Patent: May 24, 2011

(54) INSTALLATION TOOL FOR IRRIGATION EMITTER BARBS AND TUBING PUNCH

(75) Inventors: Michael R. Myers, La Jolla, CA (US); Stephanie DePascal, Phoenix, AZ (US)

(73) Assignee: EMC Industries LLC, Las Vegas, NV (US)

(*) Notice: Subject to any disclaimer, the term of this patent is extended or adjusted under 35 U.S.C. 154(b) by 0 days.

(21) Appl. No.: 12/854,894

(22) Filed: Aug. 12, 2010

(51) Int. Cl.
*B23P 19/04* (2006.01)

(52) U.S. Cl. ........... 29/213.1; 29/255; 29/278; 29/283.5

(58) Field of Classification Search ................. 29/213.1, 29/244, 255, 263, 270, 278, 272, 280, 283.5
See application file for complete search history.

(56) References Cited

U.S. PATENT DOCUMENTS 119,895 A 10/1871 Spaulding et al.
1,464,807 A 8/1923 Clark
1,903,548 A * 4/1933 Kreis .............................. 29/254
1,938,102 A 12/1933 Hill
2,588,043 A 3/1952 Rabinowitz et al.
2,594,942 A 4/1952 Lincoln
2,986,870 A 6/1961 Blais
3,006,063 A 10/1961 Linan
3,698,419 A 10/1972 Tura
3,815,831 A 6/1974 Jooste
3,827,125 A 8/1974 Matthews
3,856,208 A 12/1974 Naftaly
3,877,280 A 4/1975 Cornell
3,885,743 A 5/1975 Wake
4,222,985 A 9/1980 Greenleaf
4,235,073 A 11/1980 Tracy
4,284,241 A 8/1981 Azalbert
4,335,493 A * 6/1982 Shivers et al. .................. 29/254
4,336,652 A 6/1982 Robertson
4,392,616 A 7/1983 Olson
4,497,321 A 2/1985 Fearing et al.
4,522,339 A 6/1985 Costa
4,561,159 A 12/1985 Schuster
4,574,477 A 3/1986 Lemkin et al.
4,675,968 A * 6/1987 Bartlett ........................... 29/254
4,785,538 A 11/1988 Meyer
4,787,139 A 11/1988 Sweet
4,825,339 A 4/1989 Boudon et al.
5,058,255 A * 10/1991 Qualkenbush .................. 29/255
5,058,414 A 10/1991 Hayes
5,168,616 A 12/1992 Klein
5,177,846 A 1/1993 Bryant
5,282,302 A 2/1994 Starks et al.
5,398,718 A 3/1995 Roinick, Sr.
5,504,982 A * 4/1996 Sharp .............................. 29/255
5,566,438 A 10/1996 Bullock
5,647,112 A 7/1997 Arvizu
5,671,520 A 9/1997 Scarborough
5,722,142 A 3/1998 Myers (Continued)

*Primary Examiner* — Lee D Wilson

(74) *Attorney, Agent, or Firm* — Adam R. Stephenson, Ltd.

(57) ABSTRACT

A tool for installing irrigation barb emitters into irrigation tubing including a cradle handle and a punch handle, the cradle handle and the punch handle being arranged in a parallel relation and connected intermediate their ends at a center point. A cradle which receives irrigation tubing is included. A punch pin allows a user to punch holes in irrigation tubing as desired with a spring loaded body which removes the punch pin when it has been driven into irrigation tubing. A barb holder allows a user to install emitter barbs into irrigation tubing as desired. A barb remover allows removal of barbs from irrigation tubing as desired.

5 Claims, 11 Drawing Sheets

U.S. PATENT DOCUMENTS

| | | | | | |
|---|---|---|---|---|---|
| 5,875,534 | A | * | 3/1999 | Jackson | 29/255 |
| 5,893,201 | A | | 4/1999 | Myers | |
| 5,991,997 | A | | 11/1999 | Schley et al. | |
| 6,148,493 | A | * | 11/2000 | Pixley et al. | 29/275 |
| 6,308,934 | B1 | * | 10/2001 | Gallo | 254/25 |
| 6,360,415 | B1 | * | 3/2002 | Wada et al. | 29/283.5 |
| 6,370,780 | B1 | | 4/2002 | Robertson et al. | |
| 6,427,303 | B1 | * | 8/2002 | McConnell et al. | 29/255 |
| 6,581,262 | B1 | | 6/2003 | Myers | |
| 6,711,791 | B2 | * | 3/2004 | Hess | 29/426.5 |
| 6,792,658 | B2 | * | 9/2004 | Capoferi et al. | 29/255 |
| 6,880,217 | B2 | * | 4/2005 | Garst | 29/235 |
| 6,948,700 | B2 | * | 9/2005 | Wood | 254/25 |
| 7,168,144 | B1 | * | 1/2007 | Haelle | 29/254 |
| 7,185,409 | B1 | | 3/2007 | Myers | |
| 7,618,031 | B2 | * | 11/2009 | Weaver et al. | 269/25 |
| 2006/0254057 | A1 | | 11/2006 | Houseman et al. | |

* cited by examiner

INSTALLATION TOOL FOR IRRIGATION EMITTER BARBS AND TUBING PUNCH

TECHNICAL FIELD

Aspects of this document relate to the field of irrigation tools, and more particularly, to tools for installing irrigation emitter barbs.

BACKGROUND

Many conventional irrigation systems use plastic tubing to distribute water to various locations. In such use, hollow irrigation emitter barbs are mounted as desired. Small diameter flexible tubing can be mounted on the barbs to place the water where desired.

Irrigation emitter barbs or emitters are generally symmetrical and are provided with sharp piercing points at either end to penetrate the wall of the tubing. Further, enlarged heads are provided to impede the withdrawal of the barb from the tubing. While irrigation emitter barbs can be installed by hand, the sharp piercing points pose a risk of injury to workers.

SUMMARY

Embodiments of irrigation tools like those disclosed in this document may include a punch handle and a cradle handle where each of the punch handle and cradle handle has a cylindrical shape. The punch handle may be slidably and telescopically received within the cradle handle. The cradle handle may have a cylinder receiving cavity at one end into which the punch handle extends and a crescent jaw having a seat adapted to support irrigation tubing at the other end. The crescent jaw may be mounted on the cradle handle opposite the punch handle. The punch handle may have a cylindrical cavity positioned proximate to the cradle handle where the cylindrical cavity has a closed threaded punch end and an open end adjacent to the cradle handle. A punch pin may extend into the cylindrical cavity and may thereby partially occlude the open end. The punch pin may have a first position extending into the crescent jaw when the punch handle is fully slidably received within the cradle handle. The punch pin may have a second position which does not extend into the crescent jaw when the punch handle is not received fully within the cradle handle. The punch pin may be biased to the second position whereby irrigation tubing held within the crescent jaw is punctured when the punch pin is moved from the second position to the first position.

At least one barb holder may be mounted on the punch handle and the at least one barb holder may include a lower cavity, a middle cavity, and an upper cavity concentrically oriented and cylindrically shaped with the upper cavity being of smaller diameter than the middle cavity thereby forming an upper shoulder therebetween. The middle cavity may be a smaller diameter than the lower cavity thereby forming a lower shoulder therebetween. A plurality of resilient flaps may extend inwardly from the periphery of the lower cavity. The upper shoulder within the hollow cylinder may be suitable for acting against an annular disk shoulder on a barb emitter to force a piercing point on the barb emitter to penetrate a periphery of an irrigation tubing when forced thereupon. The plurality of flaps may releasably hold the barb emitter within the barb holder. A barb remover including a lower crescent gap and an upper crescent gap positioned at the distal ends of the crescent jaw may be included where the crescent gaps may be in parallel alignment. The crescent gaps may be adapted to engage shoulder disks of emitter barbs to pry the emitter barbs from irrigation tubing.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments may be more readily described by reference to the accompanying drawings in which.

DESCRIPTION

Figure 1:
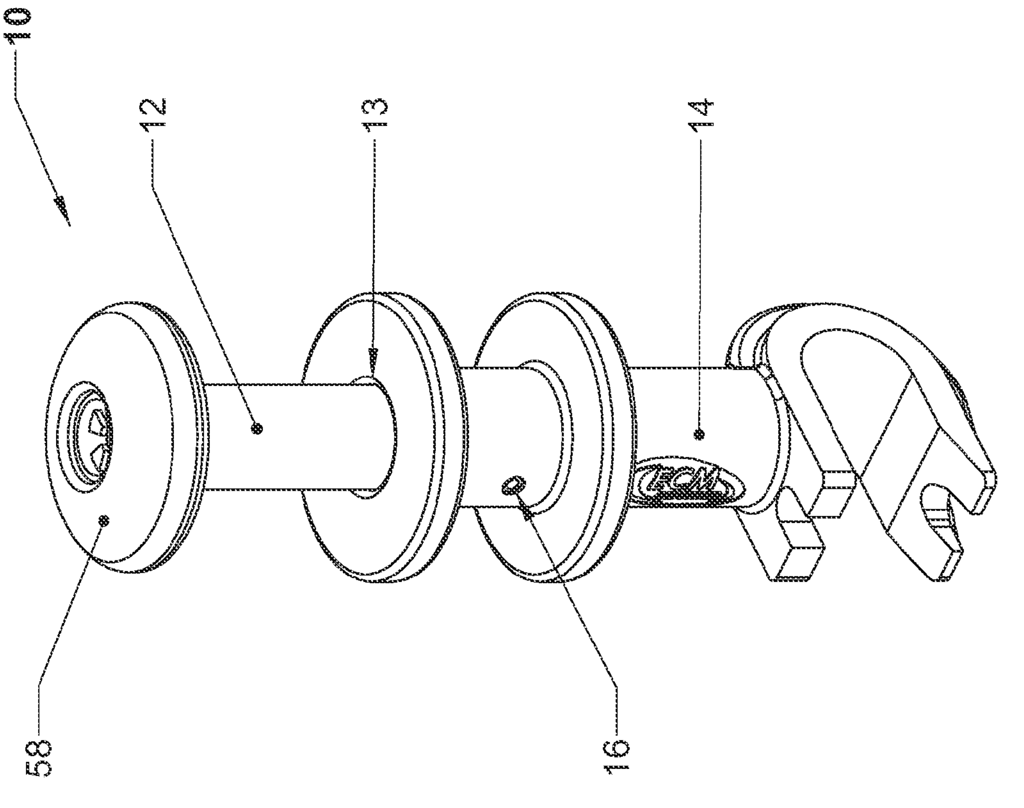
FIG. 1 is a front, side and top perspective view of one embodiment.
Figure 2:
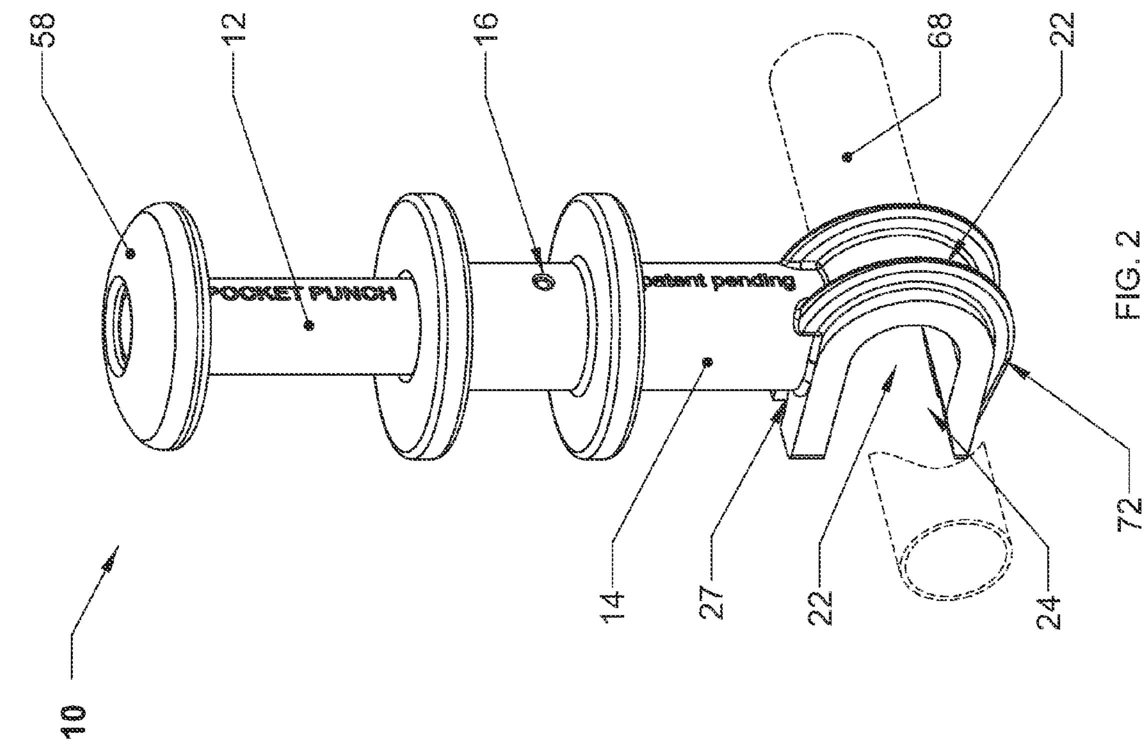
FIG. 2 is a rear, side and top perspective view of the embodiment of FIG. 1.

Referring more particularly to the drawings by characters of reference, FIGS. 1-11 disclose one embodiment of an irrigation tool 10. Irrigation tool 10 comprises a punch handle 12 and a cradle handle 14, both the punch handle 12 and the cradle handle 14 having concentric cylindrical shape. Punch handle 12 and cradle handle 14 are arranged in parallel relation and connected intermediate their ends at roll pin 16. In the illustrated embodiment, cradle handle 14 has a cylinder receiving cavity 13 at end of handle through which punch handle 12 extends into.

Cradle handle 14 includes circular finger holds 52 and 56 extending perpendicular thereto and laterally therefrom. In addition, punch handle 12 includes a circular palm push 58 mounted opposite cradle handle 14.

Figure 3:
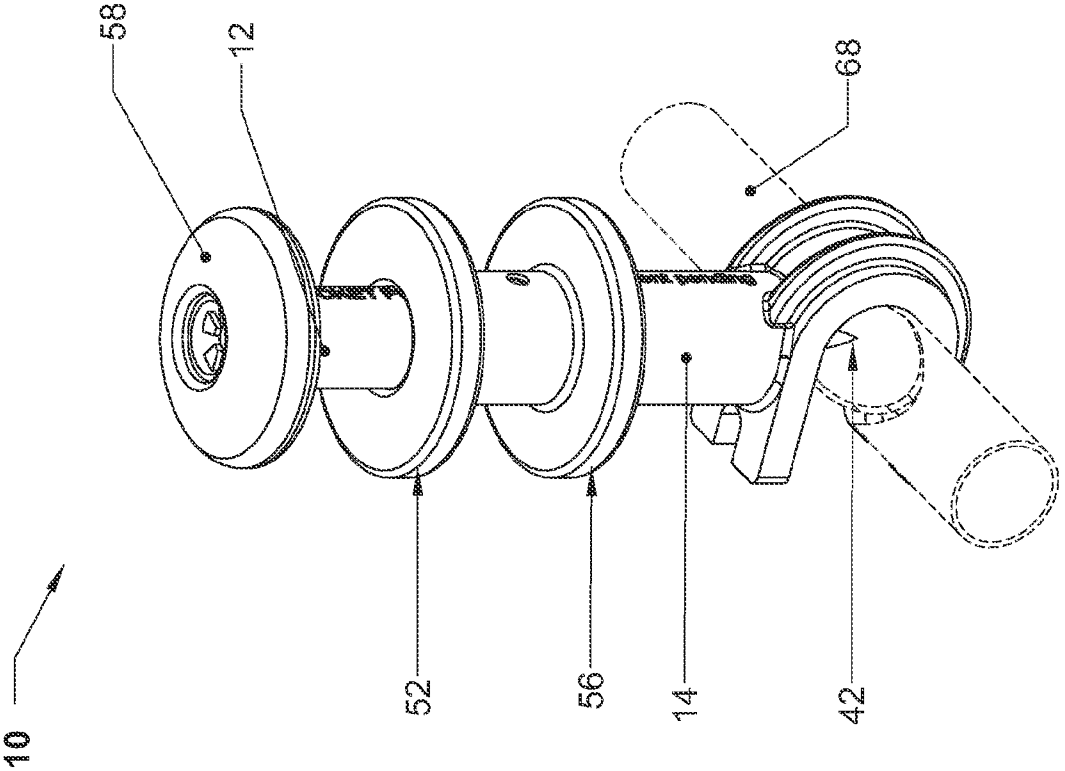
FIG. 3 is a rear, side and top perspective view of the embodiment of FIG. 1 in a closed position.

Mounted on cradle handle 14 opposite punch handle 12 is a crescent jaw 22 adapted to receive and support a conduit or pipe 68 to be punched. Crescent 22 is formed of a generally channel-shaped configuration thereby defining a semi-circular seat 72 for supporting conduit or pipe 68 to be punched. As best seen in FIG. 3, a user drives a punch pin 42 into conduit or pipe 68 by applying downward pressure on punch handle 12 with the user's palm pushing downward on push handle 58 while using finger holds 52 and/or 56 of cradle handle 14 to maintain a hold on tool 10.

Figure 4:
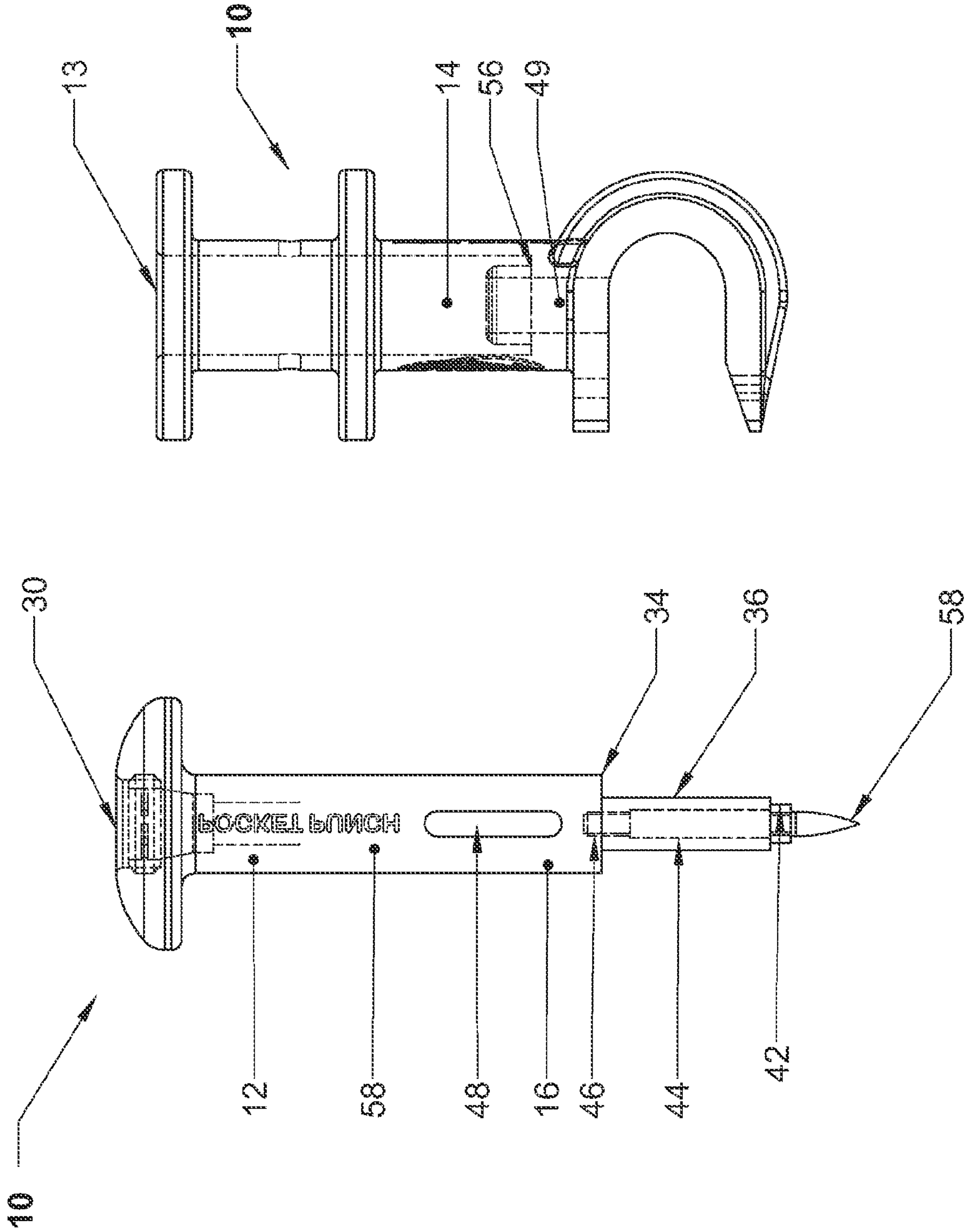
FIG. 4 is a side view of separated items of FIG. 3.
Figure 5:
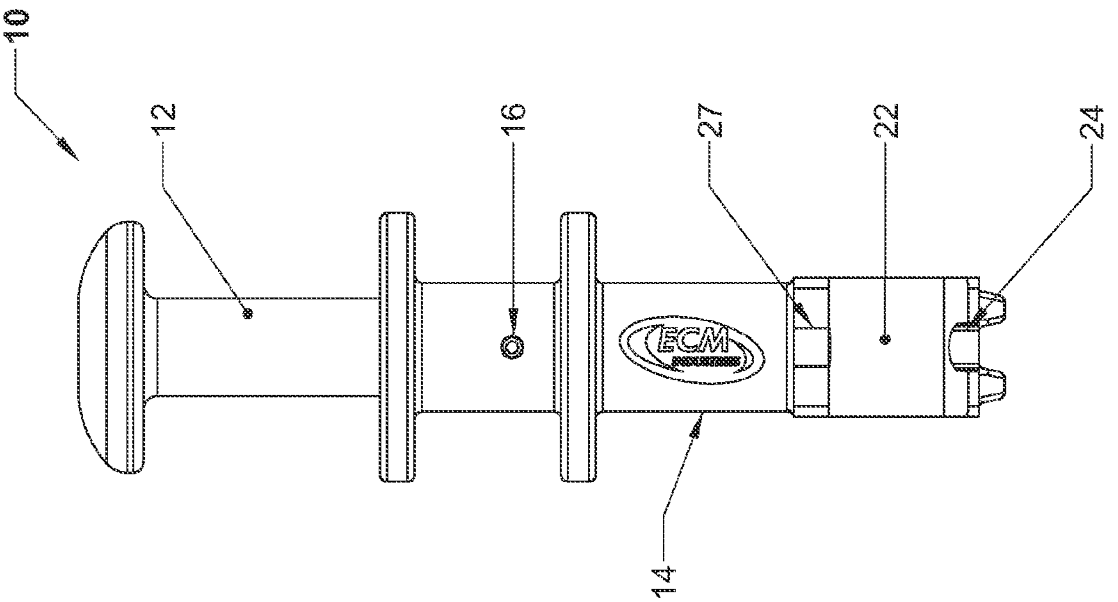
FIG. 5 is a front view of FIG. 1.
Figure 6:
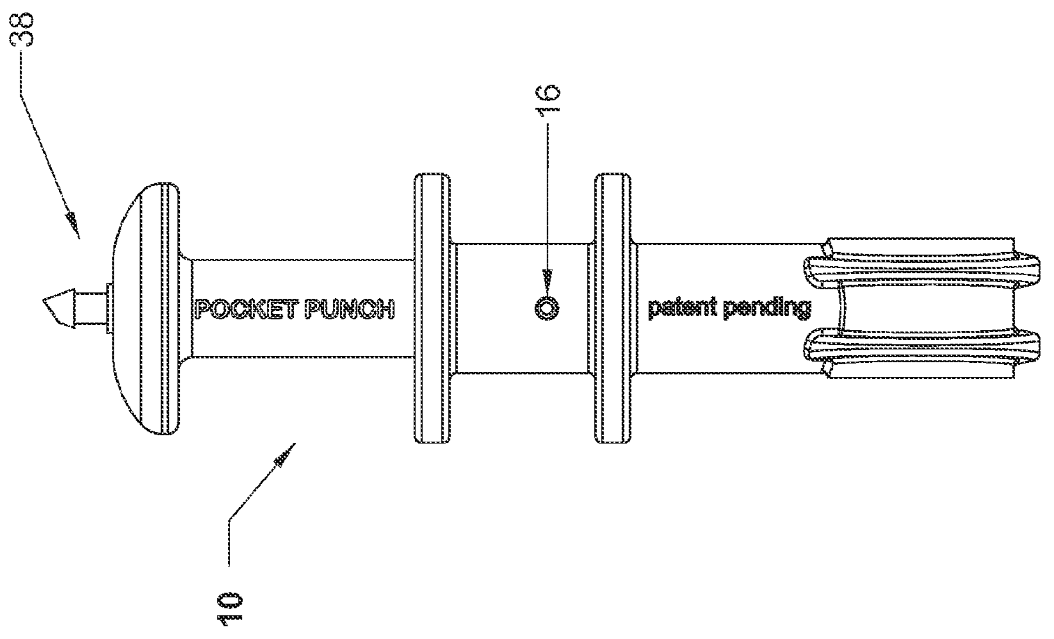
FIG. 6 is a back view of FIG. 1 with irrigation emitter barb installed therein.
Figure 7:
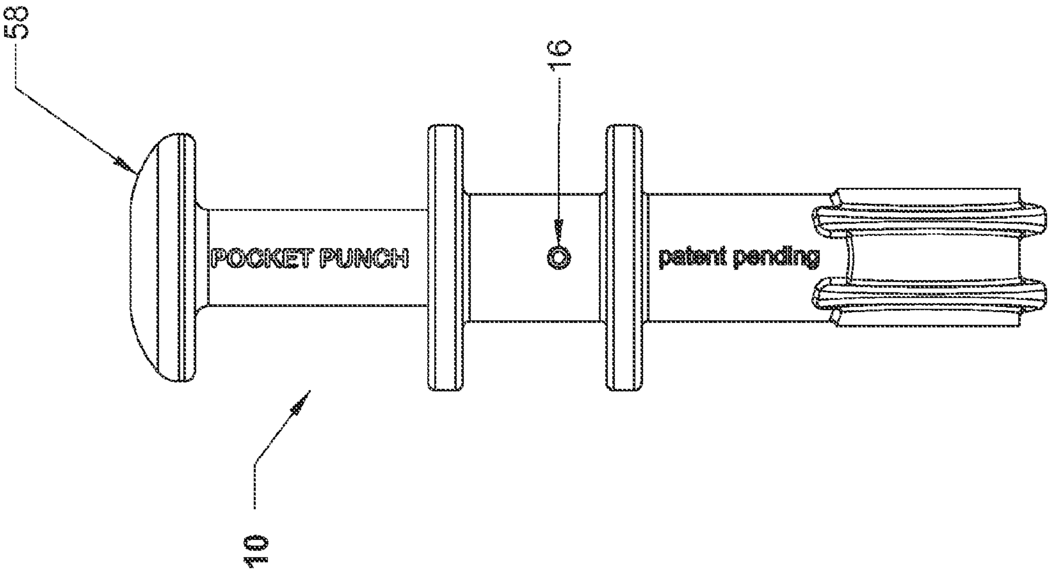
FIG. 7 is a rear view of FIG. 1.
Figure 8:
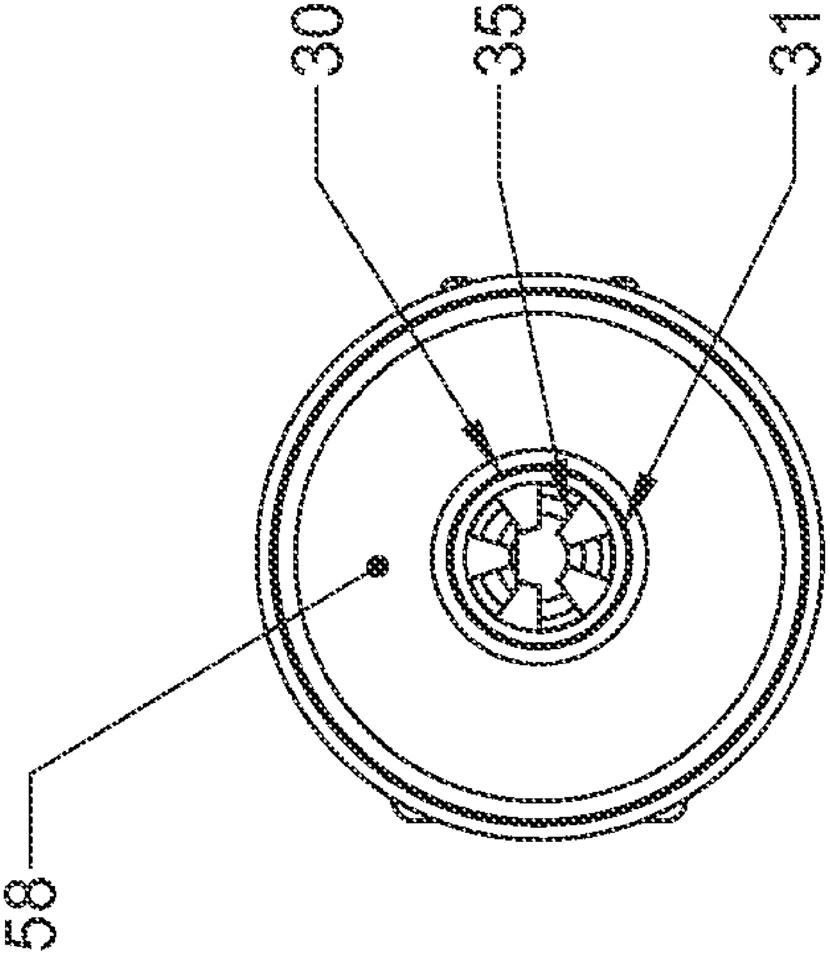
FIG. 8 is a top view of FIG. 1.
Figure 11:
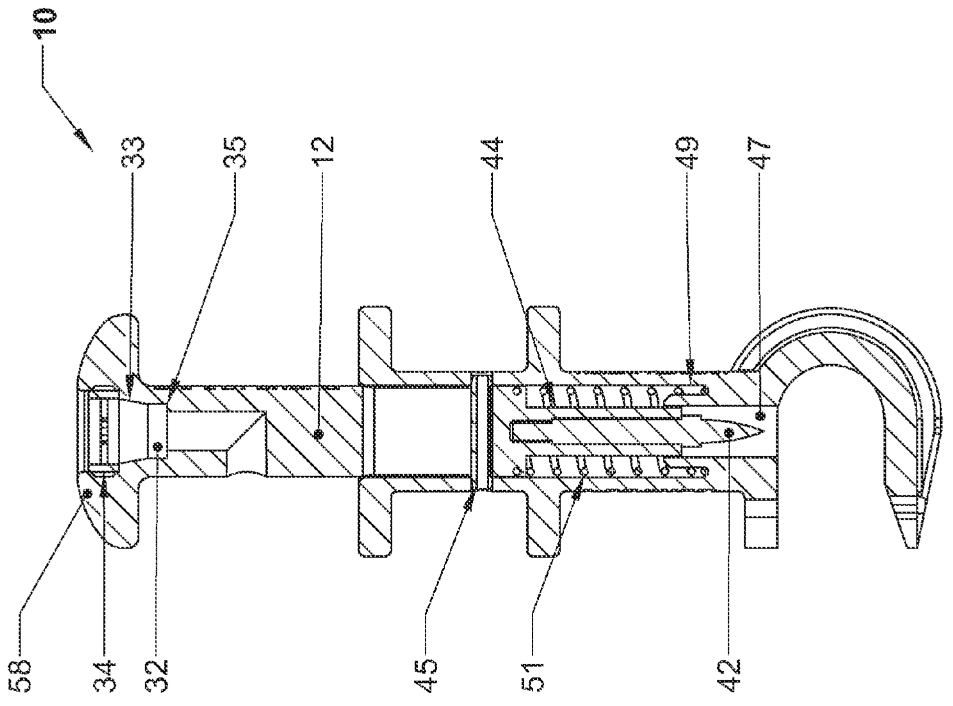
FIG. 11 is a side cross sectional view of FIG. 1.

As shown in FIGS. 4 and 11, punch pin 42 is mounted at the end of punch handle 12 opposite palm push 58. That end includes a hollow first cylindrical cavity 44 having a closed threaded punch end 46 at the upper end of cylinder 44. At the open, lower end of cylinder 44, punch pin 42 extends inwardly therefrom to partially occlude the lower, open end of cylinder 44.

Cylinder receiving cavity 13 in cradle handle 14 telescopically receives punch handle 12. Cylinder receiving cavity 13 includes a hollow cylinder 49 at the lower end of cylinder receiving cavity 13 to sizably engage the exterior section of first cylindrical cavity 44. Punch handle 12 in combination with a slit 48 in punch handle 12 and roll pin 45 mounted on cradle handle 14 prevents complete separation of punch handle 12 and cradle handle 14.

Punch handle 12 has a punch holder body 36 extending downward therefrom. A spring 51 is wrapped concentrically around punch holder body 36 which rests against shoulder 34 of punch holder 12 and against shoulder 56 of cradle handle 14. Spring 51 resiliently urges punch handle 12 away from cradle handle 14, thereby keeping second hollow cylinder 44 at a maximum extension from cylinder 49 in cradle handle 14. Punch pin 42 having a sharp tip 59 extends downwardly from punch holder 36 to extend through a second cylinder 49 in cradle handle 14 to a point beyond first hollow cylinder 56 but within crescent 22 when spring 51 is at its full permitted compression. In the maximum extension configuration, sharp tip 59 of punch pin 42 is completely contained within hollow cylinder 49.

To use, conduit or pipe 68 is placed into crescent 22 and punch pin 42 is placed into hollow cylinder 44. Punch pin 42 is positioned on top of conduit or pipe 68. A user employs finger holds 52 or 56 of crescent handle 14 and palm push 58 of punch handle 12 to squeeze handles 12 and 14 together thereby pushing punch pin 42 downwardly. Punch pin 42 of second hollow cylinder 44 first engages the periphery of irrigation tubing 68. As handles 12 and 14 are squeezed together it forces cylinder 44 to retract downwardly with spring 51 compressing. Sharp point 58 of punch pin 42 then extends beyond second hollow cylinder 49 and engages the periphery of irrigation tubing 68 and with additional force, punches a hole therethrough.

After a hole is punched, punch pin 42 is withdrawn. As punch 42 moves away, crescent 22 secures the periphery of irrigation tubing 68 and prevents movement of said tubing. Spring 51 forces punch pin 42 of second hollow cylinder 44 upward whereby punch pin 42 is forced from said periphery of irrigation tubing 68. In various embodiments, the forced release of punch pin 42 from irrigation tubing 68 may prevent said sharp point 58 from hanging up on said tubing.

Mounted on punch handle 12 is a barb holder 30. Barb holder 30 is positioned on the top end of punch handle 12 centered on palm push 58 oriented opposite to cradle handle 14.

As best seen in FIG. 11, in particular embodiments, barb holder 30 can be threaded into punch handle 12 which comprises a lower cavity 32, a middle cavity 33 and an upper cavity 34 concentrically oriented with respect to one another. All cavities 32, 33, and 34 are cylindrically shaped with upper cavity 34 being of larger diameter and threaded than middle cavity 33 which, in turn is of larger diameter than lower cavity 32 thus forming shoulders 35 and 37 therebetween. Extending inwardly in upper cavity 34 is a threaded barb holder 30 with flaps 35. In the illustrated embodiment of FIG. 8, five flaps 35 are symmetrically orientated about the periphery of inner ring 31. Each flap 35 is preferably, a resilient rubber or plastic material. Outer ring 30 has male threads for installation into upper cavity 34. Those skilled in the art will recognize that the five flaps used herein are exemplary in nature and that other flaps and flap types may be utilized in other embodiments.

Figure 9:
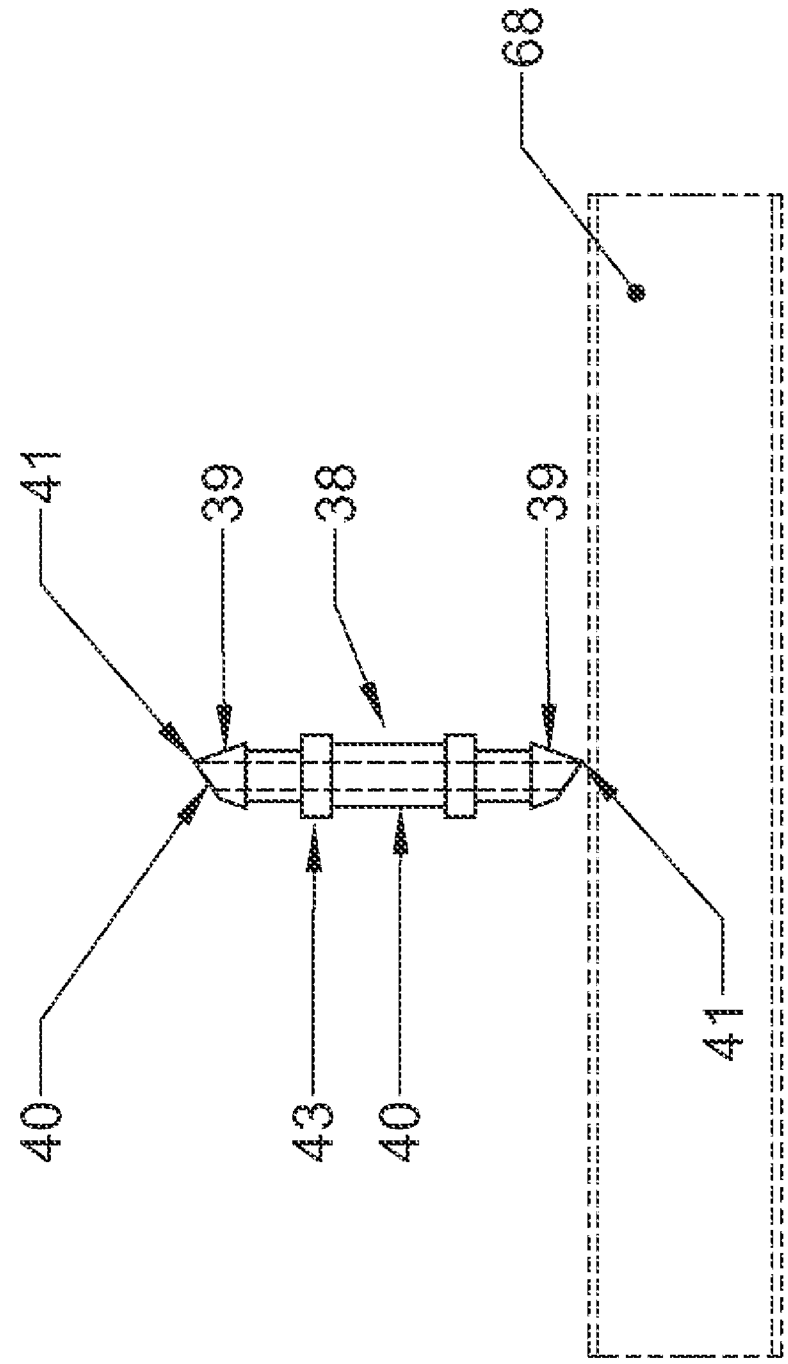
FIG. 9 is a side view of irrigation emitter barb.
Figure 10:
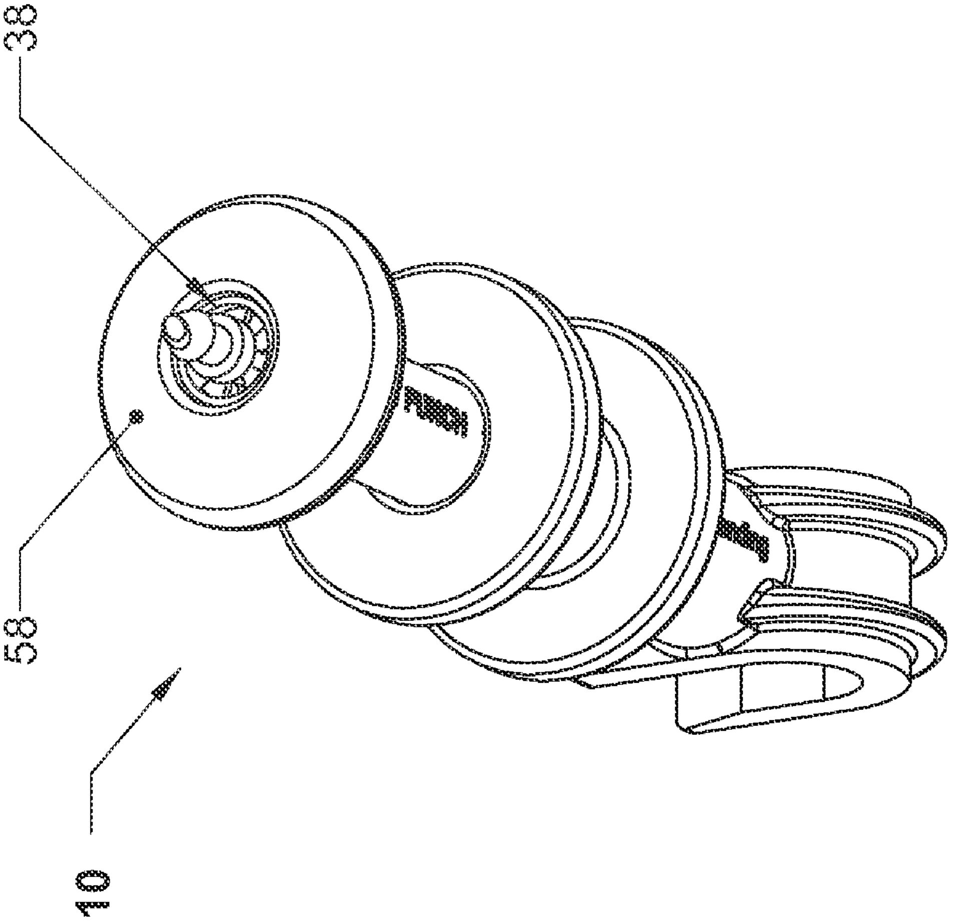
FIG. 10 is a top view of FIG. 1 with irrigation emitter barbs installed therein.

An emitter barb 38 shown in embodiment FIG. 9 generally comprises a hollow cylinder 40 having two enlarged heads 39 having a larger diameter than cylinder 40 at either end thereof. Each enlarged head 39 includes a sharp piercing point 4 which allows barbs 38 to pierce the periphery of irrigation tubing 68. Once enlarged head 39 extends completely into irrigation tubing 68 its larger diameter impedes its withdrawal from irrigation tubing 68.

Further, emitter barb 38 includes an annular shoulder disk 43. Shoulder disk 43 in cooperation with enlarged heads 39 hold the wall of irrigation tubing 68 therebetween when emitter barb 38 is properly inserted therein. As is well known in the art, emitter barb 38 may vary in configuration and both emitter barb 38 and irrigation tubing 68 are manufactured of plastics.

Cooperatively upper cavity 34 is sized and threaded to reasonably engage threaded barb holder 30. Emitter barb 38 can be pushed thru flaps 35 of barb holder into lower cavity 32 of punch handle 12 which is large enough to accommodate shoulder disk 43. To use, enlarged head 39 of emitter barb 38 is inserted into and engaged by upper cavity 34 and barb holder 30 while shoulder disk 43 engages shoulder 35 of barb holder 30. When fully inserted, the second shoulder disk 43 of barb emitter 38 is engaged by flaps 35 which act to reasonably retain barb emitter 38 therewithin. In various embodiments, this aspect may allow insertion and retention of emitter barb 38 within barb holder 30 before insertion into irrigation tubing.

Irrigation tubing 68 is laid on the ground or held while a user grasps tool 10 to push barb 38 which is placed into barb holder 30 into punched hole in irrigation tubing 68, and with additional force, is inserted therethrough. Shoulder 35 in cooperation with barb holder 30 forces piercing point 41 through the periphery of irrigation tubing 68 while lower shoulder disk 43 prevents insertion beyond the appropriate point. The periphery of the irrigation tubing 68 is thereby captured between enlarged head 39 and lower shoulder disk 43.

After insertion, barb holder 30 of tool 10 is withdrawn. As barb holder 30 moves away, flaps 35 release shoulder disks 43 as upper enlarged head 39 releases from upper cavity 34 and barb emitter 38 is left properly inserted within irrigation tubing 68. As seen, the resiliency of flaps 35 holding shoulders 43 therein may be less than the force required to withdraw lower enlarged head from irrigation tubing 68 in particular embodiments.

As best seen in FIGS. 1-11, in various embodiments, barb remover includes a lower crescent gap 24 and an upper crescent gap 27 positioned at the distal ends of main body crescent 22. Crescents 24 and 27 are positioned on the front of crescent 22 and in parallel alignment with one another centered on tool 10.

To use, main body 40 of emitter barb 38 is inserted into either crescent gap 24 and 27 with shoulder disk 43 of barb 38 placed on the outside thereof. While rotating tool 10 in a backwardly motion, barb emitter 38 is pried out of irrigation tubing 68. This aspect of particular embodiments may allow removal of emitter barb 38 from said tubing 68.

In places where the description above refers to particular embodiments of irrigation tools, it should be readily apparent that a number of modifications may be made without departing from the spirit thereof and that these embodiments may be applied to other irrigation tool embodiments.

What is claimed is:

1. An irrigation tool for inserting and removing irrigation emitter barbs from tubing, the irrigation tool comprising:

a punch handle and a cradle handle, each handle having a cylindrical shape, the punch handle being slidably and telescopically received within the cradle handle, the cradle handle having a cylinder receiving cavity at one end thereof into which the punch handle extends and a crescent jaw having a seat adapted to support irrigation tubing at the other end, the crescent jaw mounted on the cradle handle opposite the punch handle, the punch handle having a cylindrical cavity positioned proximate to the cradle handle, the cylindrical cavity having a closed threaded punch end and an open end adjacent the cradle handle, a punch pin extending into the cylindrical cavity thereby partially occluding the open end, the punch pin having a first position extending into the crescent jaw when the punch handle is fully slidably received within the cradle handle, the punch pin having a second position which does not extending into the crescent jaw when the punch handle is not received fully within the cradle handle, the punch pin being biased to the second position, whereby irrigation tubing held within the crescent jaw is punctured when the punch pin is moved from the second position to the first position, at least one barb holder mounted on the punch handle, the barb holder comprising a lower cavity, a middle cavity, and an upper cavity concentrically oriented and cylindrically shaped with the upper cavity being of smaller diameter than the middle cavity thereby forming an upper shoulder therebetween and the middle cavity being a smaller diameter than the lower cavity thereby forming a lower shoulder therebetween, a plurality of resilient flaps extending inwardly from the periphery of the lower cavity, the upper shoulder within the hollow cylinder being suitable for acting against an annular disk shoulder on a barb emitter to force a piercing point on the barb emitter to penetrate a periphery of an irrigation tubing when forced therein, the plurality of flaps releasably holding the barb emitter within the barb holder; and a barb remover including a lower crescent gap and an upper crescent gap positioned at the distal ends of the crescent jaw, the crescent gaps being in parallel alignment, the crescent gaps being adapted to engage shoulder disks of emitter barbs to pry the emitter barbs from irrigation tubing.

2. The irrigation tool of claim 1 wherein the cradle handle includes two circular finger holds extending perpendicular and laterally therefrom.

3. The irrigation tool of claim 1 wherein the punch handle includes a circular palm push mounted opposite the cradle handle to move the punch pin from the first position to the second position.

4. The irrigation tool of claim 3 wherein at least one barb holder is positioned in the palm push.

5. The irrigation tool of claim 1 further comprising a roll pin extending laterally from the cradle handle and engaging a slit in the punch handle to allow the punch handle to be slidably received within the cradle handle without separation therefrom.

* * * * *

UNITED STATES PATENT AND TRADEMARK OFFICE

CERTIFICATE OF CORRECTION

| | |
|---|---|
| PATENT NO. | : 7,946,010 B1 |
| APPLICATION NO. | : 12/854894 |
| DATED | : May 24, 2011 |
| INVENTOR(S) | : Michael R. Myers and Stephanie DePascal |

It is certified that error appears in the above-identified patent and that said Letters Patent is hereby corrected as shown below:

On the title page, item [73] "Assignee", cancel "EMC" and insert --ECM--.

Claim 1, column 5, line 9, replace "extending" with --extend--.

Signed and Sealed this
Ninth Day of August, 2011

David J. Kappos

*Director of the United States Patent and Trademark Office*